June 22, 1937.  J. C. ADAMS  2,084,881
ELECTRIC TOASTER
Filed July 31, 1935
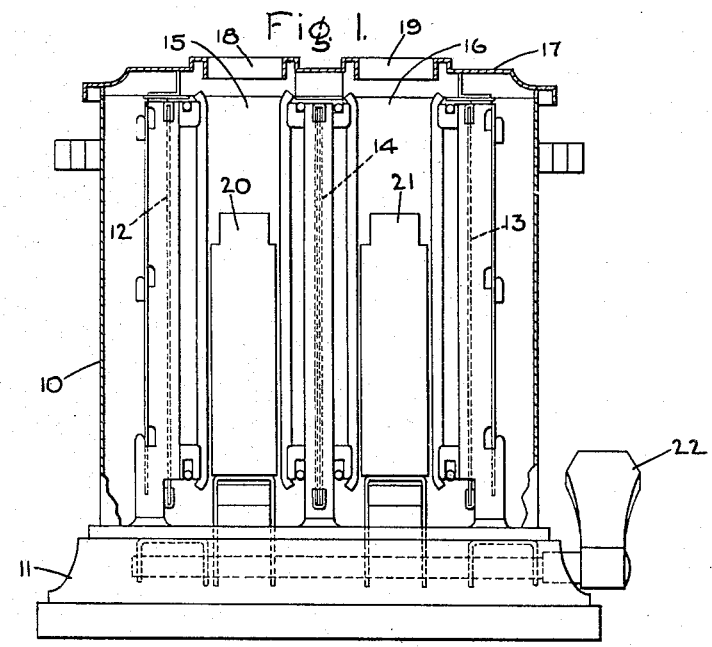
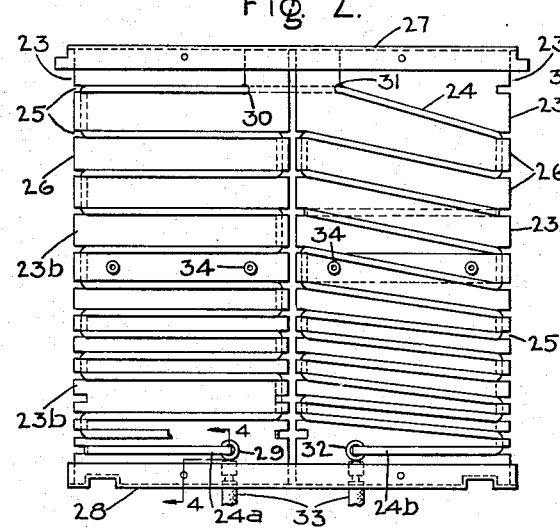
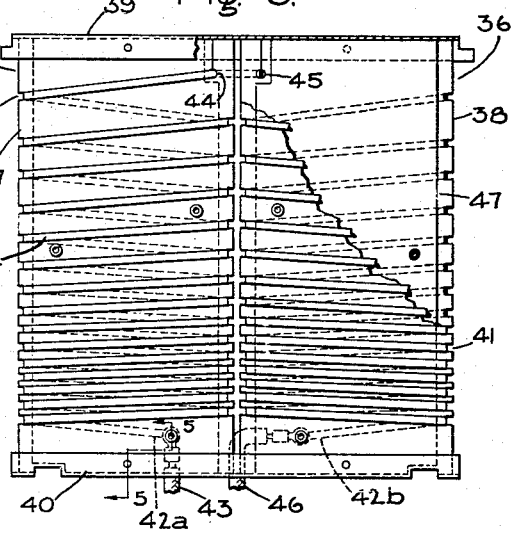
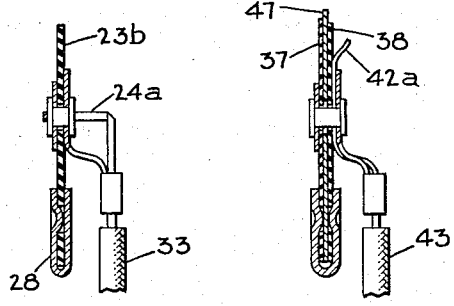
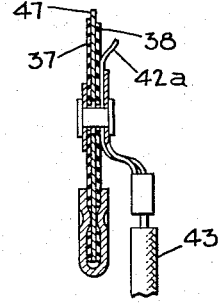
Inventor:
Joy C. Adams,
by Harry E. Dunham
His Attorney.

Patented June 22, 1937

2,084,881

UNITED STATES PATENT OFFICE 2,084,881

ELECTRIC TOASTER

Joy C. Adams, Bridgeport, Conn., assignor to General Electric Company, a corporation of New York Application July 31, 1935, Serial No. 33,982

2 Claims. (Cl. 219—19)

This invention relates to electric toasters, and it has for its object the provision of an improved device of this character.

More specifically, this invention relates to electric toasters provided with a plurality of heating compartments for toasting several slices of bread at the same time. Many household toasters are provided with two toasting compartments. Within each compartment are a pair of heating elements arranged on opposite sides of the compartment so as to apply heat to the opposite sides of the slice of bread inserted within the compartment. In the interests of economy and simplicity in construction, it is the usual practice to control all of the heating means for the two compartments by means of a single switch so that when the switch is opened, the heat sources for both compartments are deenergized, whereas when the switch is closed heat is applied to both compartments.

Toasters of this type are satisfactory for toasting two slices at the same time, but not for toasting a single slice at a time. This is because heat energy is transferred from the idle compartment to the adjacent side of the slice of bread in the active compartment, with the result that the toast is not uniformly browned inasmuch as the inner side of the toast adjacent the idle compartment will be somewhat darker than the outer side. This invention contemplates the provision of an improved and inexpensive toaster of relatively simple construction arranged to isolate the toasting compartments thermally so that energy from an idle compartment will not affect the toasting of a single slice in the active compartment.

In accordance with this invention, each compartment of the toaster is provided at its outer side with a heating unit, while a heating unit organization is interposed between the compartments to provide sources of heat at the inner sides of the compartment.

This heating unit organization, in one form of the invention, comprises a pair of heat insulating sheets between which is sandwiched a heat barrier, preferably in the form of a metallic sheet provided with heat reflecting surfaces. The insulating sheets with the heat barrier between them are secured together into a single supporting unit. A resistance conductor is wound upon this unit so as to be distributed over the outer surfaces of the insulating sheets. The heating organization is supported between the toasting compartments so that the resistance conductor is presented to the inner sides of the slices of bread placed within the compartments.

In another form of this invention, two separate insulating sheets may be used for supporting resistance conductors at the inner sides of the compartments, the heat barrier in this case being supported between the inner surfaces of these two supports.

For a more complete understanding of this invention, reference should be had to the accompanying drawing in which Fig. 1 is a front elevation of an electric toaster embodying this invention; Fig. 2 is an elevation of a heating unit organization used in the toaster of Fig. 1; Fig. 3 is an elevation of still another heating unit organization used in the electric toaster of Fig. 1; Fig. 4 is a sectional view taken through the line 4—4 of Fig. 2; and Fig. 5 is a sectional view taken through the line 5—5 of Fig. 3.

Referring to the drawing, this invention has been shown as applied to an electric toaster provided with two toasting compartments. While this invention is applicable to electric toasters generally that are provided with two or more heating compartments, it has been illustrated as applied to an electric toaster of the type described and claimed in U. S. patent to C. P. Randolph, No. 2,005,635, dated June 18, 1935, with the exception that in the instant application, the toaster is shown as provided with two compartments, whereas in the Randolph patent, the toaster is shown as provided with but a single toasting compartment.

As shown, the electric toaster comprises an outer casing 10 mounted upon a base 11. Arranged within the casing 10 adjacent to the side walls thereof, there are a pair of heating elements 12 and 13. Substantially midway between the heating elements 12 and 13 is a heating organization 14. The spaces between the heating elements 12 and 14 and 13 and 14 respectively define toasting compartments 15 and 16. The heating elements 12 and 13 are arranged to provide toasting energy sources at the outer sides of the two compartments respectively, while the heating element 14 is arranged to provide toasting heat energy sources at the inner sides of the compartments respectively. As shown, the top wall 17 of the casing 10 is provided with apertures 18 and 19 through which the bread slices are inserted into their compartments.

The slices are carried by means of bread carriers 20 and 21 and can be moved to and from a toasting position in the compartments 15 and 16 by means of a controlling knob 22. It will be understood that the controlling knob 22 also will be utilized to control a suitable time controlled switch (not shown) which in turn controls the energization of the heating units 12, 13 and 14. It is believed to be unnecessary to describe in detail the arrangements of the bread carriers 20 and 21, the control knob 22 and the switching means controlling the heating means, because they form no part of this invention, and are fully described in the above-mentioned Randolph patent.

The outer heating units 12 and 13 will be of the same construction, which is shown in Fig. 2 of the drawing. As shown in this figure, the heating unit comprises a pair of heating sections 23 and 23a arranged side by side. Each section has a sheet 23b formed of any suitable electrical insulating material, such as mica, upon which is supported a heat generating resistance conductor 24. Each sheet 23b is provided at its edges with notches 25 so as to provide a plurality of oppositely positioned ears 26. The resistance conductor 24 is wound back and forth across one surface of the sheet 23b in a plurality of convolutions, the ends of the convolutions being directed through the notches 25 so as to be anchored back of the ears 26 in a manner well known to those skilled in the art. By reason of this arrangement, practically the entire length of the active portion of the resistance conductor 24 is distributed over one surface of the supporting sheet. The upper and lower ends of the sheets are rigidly secured by means of clamps 27 and 28.

As shown, a single resistance conductor 24 is wound on both sheets; one end 24a of the resistance conductor is directed through an eyelet 29 provided for it at the lower edge of the sheet 23b, the conductor being wound upon the sheet in the manner previously described to its upper end where the conductor is directed through an aperture 30 provided for it in the sheet to the back side thereof. The conductor is then directed to the back side of the sheet 23b of section 23a where it is passed through an aperture 31 provided for it in the sheet to the front side of the sheet where it is wound downwardly upon the sheet to the lower end thereof where the opposite end 24b of the conductor is directed through an eyelet 32 to the back side of the sheet. It will be understood that the end portions 24a and 24b of the conductor directed through the eyelets 29 and 32 will be connected with suitable electrical supply leads 33.

It will also be understood that the heating units 12 and 13 will be supported within the casing 12 so that the major portion of the resistance conductor 24 will be presented to the compartments 15 and 16 respectively. In other words, the upper sides of the heating units, as shown in Fig. 2, will be presented to the toasting compartments.

It is preferable to wind the resistance conductor 24 on the right hand section 23a in the manner shown in Fig. 2, that is, so as to eliminate the convolution corresponding to the top convolution of section 23b. This is accomplished, as shown, by passing the resistance conductor 24 from the opening 31 across the sheet to its outer edge directly to the notch 25 second from the top of the sheet. The reason for this is that the front walls of the bread carriers 21 do not extend to the top of the heating chambers, and as a result, there is a flow of heat toward the front of the toaster. It is desirable, therefore, to cut down somewhat the generation of heat at the front of the toaster, and this has been accomplished by eliminating the top convolution of the right hand section 23a. It will be understood that this section in each case is positioned at the front of the toaster.

It is to be noted that each of the sheets 23b is in turn formed of two sheets of mica which are substantially the same size and which are riveted together at the center of the sheet by means of suitable rivets 34.

The heating unit organization 14 differs from the outside units 12 and 13 in that it is arranged to provide a toasting heat energy source for both of the inner sides of the compartments 15 and 16. This unit, like the units 12 and 13, is provided with two heating sections 35 and 36. Each heating section is defined by means of a pair of insulating sheets 37 and 38 (Fig. 5) arranged in superposed relation. These sheets 37 and 38 are rigidly secured together at their upper and lower ends by means of clamping devices 39 and 40. It will be observed that these clamping devices function to clamp the upper and lower ends of the mica sheets 37 and 38 of both heating sections together.

The sections 35 and 36 at their edges are provided with cut-out portions or notches 41, which are similar to the notches 25 of the unit shown in Fig. 2, except that the notches in the opposite edges are arranged in staggered relation, as clearly shown in Fig. 3. A suitable resistance conductor 42 is wound upon the sections 35 and 36, the portion of the conductor on each section being wound back and forth across both surfaces of the section, rather than being wound so that the conductor is presented on one side only of the section, as is the case in Fig. 2. As shown, one end 42a of the resistance conductor is secured to a suitable supply lead 43 and is wound back and forth across opposite sides of the section 35 until it reaches the top where it is directed through an aperture 44 to the back side of the sheet. Thence, it is directed upwardly through an aperture 45 in section 36 from the lower to the upper surface of this section, and thence, is wound downwardly to the lower end thereof where the end 42b of the resistance conductor is secured to a supply lead 46.

In order to prevent the transfer of heat from an idle compartment to an active compartment while a single slice is being toasted, a suitable heat barrier is interposed between the insulating sheets 37 and 38 of each heating section of the unit 14. Preferably, this heat barrier will be in the form of a metallic sheet 47 co-extensive with the sheets 37 and 38 and sandwiched between them. This sheet is rigidly clamped to the sheets 37 and 38 by the clamping devices 39 and 40, as shown in Figs. 3 and 5. While the sheet may be formed of any suitable material, it is preferable to use aluminum. The two surfaces of the metallic sheet 47 will be polished so as to act as heat reflecting surfaces to direct radiation to the compartments 15 and 16, rather than permitting the transfer of heat by radiation from one compartment to the other.

If desired, the central heating organization may be provided by a pair of heating elements similar to the elements 12 and 13 arranged back to back with their resistance heating elements presented to the two compartments respectively. In this case, the heat barrier will be defined by a metallic sheet similar to the sheet 47 interposed between the two heating elements.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. An electric toaster comprising a pair of toasting compartments, heating means at the outer sides of said compartments to provide toasting heat energy sources at said outer sides, and a heating element interposed between said compartments having a heat reflecting member, mica supports on opposite sides of said reflecting member, and resistance heating means on said mica supports to provide heat energy sources at the inner sides of said compartments cooperating with those at the outer sides so that a pair of slices can be toasted uniformly on both sides in said compartments at the same time, said reflecting member and mica supports substantially preventing the transfer of heat from one compartment to the other so that a single slice can be toasted uniformly on both sides in either compartment while the other compartment is empty.

2. An electric toaster comprising a pair of toasting compartments, heating means at the outer sides of said compartments to provide toasting heat energy sources at said outer sides, and heating means between said compartments provided with a metallic sheet having polished surfaces presented to said compartments respectively, insulating supporting means on opposite sides of said metallic sheet and resistance conductor heating means mounted on said supporting means so as to be presented to said compartments to provide toasting heat energy sources at their inner sides, cooperating with those at the outer side so that a pair of slices can be toasted uniformly on both sides in said compartments at the same time, said metallic sheet substantially preventing the transfer of radiant heat from one compartment to the other so that a single slice can be toasted uniformly on both sides in either compartment while the other compartment is empty.

JOY C. ADAMS.